United States Patent [19]

Morinaga

[11] Patent Number: 5,727,143
[45] Date of Patent: Mar. 10, 1998

[54] FAULT-TOLERANT SYSTEM CAPABLE OF RAPIDLY RECOVERING A SYSTEM FUNCTION WHEN A FUNCTIONAL BLOCK BECOMES A FAULTY BLOCK

[75] Inventor: Satoshi Morinaga, Tokyo, Japan

[73] Assignee: NEC Corporation, Tokyo, Japan

[21] Appl. No.: 637,077

[22] Filed: Apr. 24, 1996

[30] Foreign Application Priority Data

Apr. 24, 1995 [JP] Japan .................... 7-098334

[51] Int. Cl.⁶ .................... G06F 17/10; G06F 11/16; G06F 19/00
[52] U.S. Cl. .................... 395/182.01; 364/491
[58] Field of Search .................... 395/182.01, 184.01, 395/182.04, 181, 182.03, 182.05, 182.07, 182.08, 500; 364/491

[56] References Cited

U.S. PATENT DOCUMENTS

| | | | |
|---|---|---|---|
| 5,068,823 | 11/1991 | Robinson | 395/500 |
| 5,463,545 | 10/1995 | Umeda et al. | 364/187 |
| 5,469,390 | 11/1995 | Sasaki et al. | 365/200 |
| 5,485,604 | 1/1996 | Miyoshi et al. | 395/182.08 |
| 5,576,969 | 11/1996 | Aoki et al. | 364/491 |

OTHER PUBLICATIONS

Narasimhan et al., "Yield Enhancement of Programmable ASIC Arrays By Reconfiguration of Circuit Placements", *IEEE Transactions on Computer–Aided Design of Integrated Circuits and Systems*, vol. 13(8):976–986, (Aug. 1994).

*Primary Examiner*—Ly Hua
*Attorney, Agent, or Firm*—Foley & Lardner

[57] ABSTRACT

A fault-tolerant system has a predetermined system function and comprises a plurality of functional blocks. The fault-tolerant system uses selected ones of the functional blocks to construct the predetermined system function and uses a remaining one of the functional blocks to recover the predetermined system function when one of the selected functional blocks becomes a faulty functional block. The fault-tolerant system comprises a memory device for memorizing a plurality of block connection relationships each of which is representative of a functional block connection for providing the predetermined system function. A detecting device detects the faulty functional block to produce a fault signal. An accessing device accesses the memory device in response to the faulty signal to select a selected one of the block connection relationships that does not include the faulty functional block. A recover device recovers the predetermined system function in accordance with the selected block connection relationship.

2 Claims, 18 Drawing Sheets

FAULT-TOLERANT SYSTEM CAPABLE OF RAPIDLY RECOVERING A SYSTEM FUNCTION WHEN A FUNCTIONAL BLOCK BECOMES A FAULTY BLOCK

BACKGROUND OF THE INVENTION

This invention relates to a fault-tolerant system having a fault-tolerant function.

As known in the art, a fault-tolerant system is a system capable of recovering a system function when a functional block or unit becomes a faulty functional block. The functional block may be, for example, a processor array.

A conventional fault-tolerant system is disclosed in an article titled "Yield Enhancement of Programmable ASIC Arrays by Reconfiguration of Circuit Placements" which is contributed by J. Narasimhan et al. in IEEE Transactions on Computer-Aided Design of Integrated Circuits and Systems, Vol. 13, No. 8, August, 1994, pages 976 to 986.

In the conventional fault-tolerant system, selected functional blocks are selected as used functional blocks from a plurality of functional blocks. The used functional blocks are connected to one another in order to provide the system function. When one of the used functional blocks becomes a faulty functional block, the faulty functional block is disconnected from the remaining used functional blocks. One of the unused functional blocks is selected as a specific functional block from the unused functional blocks. In order to reconstruct or recover the system function, the specific functional block is connected to at least one of the remaining used functional blocks.

As readily understood from the above description, it is necessary to carry out a lot of processes in the conventional fault-tolerant system in order to reconstruct the system function. As a result, it is difficult to reconstruct the system function at a high speed in the conventional fault-tolerant system. Furthermore, it is necessary to utilize an arithmetic processor having high processing ability since the conventional fault-tolerant system carries out a lot of processes.

SUMMARY OF THE INVENTION

It is therefore an object of this invention to provide a fault-tolerant system capable of rapidly recovering a system function when a functional block becomes a faulty functional block.

It is another object of this invention to provide a fault-tolerant system having a simple structure.

Other objects of this invention will become clear as the description proceeds.

According to an aspect of this invention, there is provided a fault-tolerant system having a predetermined system function and comprising a plurality of functional blocks. The fault-tolerant system uses selected ones of the functional blocks to provide the predetermined system function and uses chosen ones of the functional blocks except for a faulty functional block to recover the predetermined system function when one of the selected functional blocks becomes a faulty functional block. The fault-tolerant system comprises memory means for memorizing a plurality of block connection relationships, each of which is representative of a functional block connection for the predetermined system function, detecting means for detecting the faulty functional block to produce a fault signal, accessing means responsive to the faulty signal for accessing the memory means to select a block connection relationship that does not include the faulty functional block, and recover means for recovering the predetermined system function in accordance with the selected block connection relationship.

According to another aspect of this invention, there is provided a fault-tolerant system having a predetermined system function and comprising a plurality of functional blocks. The fault-tolerant system uses selected ones of the functional blocks to provide the predetermined system function and uses chosen ones of the functional blocks except for a faulty functional block to recover the predetermined system function when one of the selected functional blocks becomes a faulty functional block. The fault-tolerant system comprises (A) memory means for memorizing a plurality of block connection relationships, each of which is representative of a functional block connection for the predetermined system function, (B) first means for producing a plurality of ideal block connection relationships in accordance with first through third numbers, the first number being representative of the number of the functional blocks, the second number being representative of the number of the selected functional blocks, the third number being representative of the number of the block connection relationships, the first means separating the functional blocks into either one of first and second block sets in accordance with the ideal block connection relationships, (C) second means for allocating each of the functional blocks included in the first block set to one of a plurality of groups on the basis of the ideal block connection relationships to produce a plurality of block groups, (D) third means for naming the functional blocks included in the second block set to produce named functional blocks, (E) fourth means for producing a plurality of restricting conditions in accordance with the block groups and the named functional blocks, the restricting conditions being representative of restrictions on forming the ideal block connection relationships, (F) fifth means for producing the block connection relationships on the basis of the restricting conditions, (G) detecting means for detecting the fault functional block to produce a faulty signal, (H) accessing means responsive to the fault signal for accessing the memory means to select a selected one of the block connection relationships that does not include the faulty functional block, and (I) recover means for recovering the predetermined system function in accordance with the selected block connection relationship.

DESCRIPTION OF THE PREFERRED EMBODIMENTS

Figure 1:
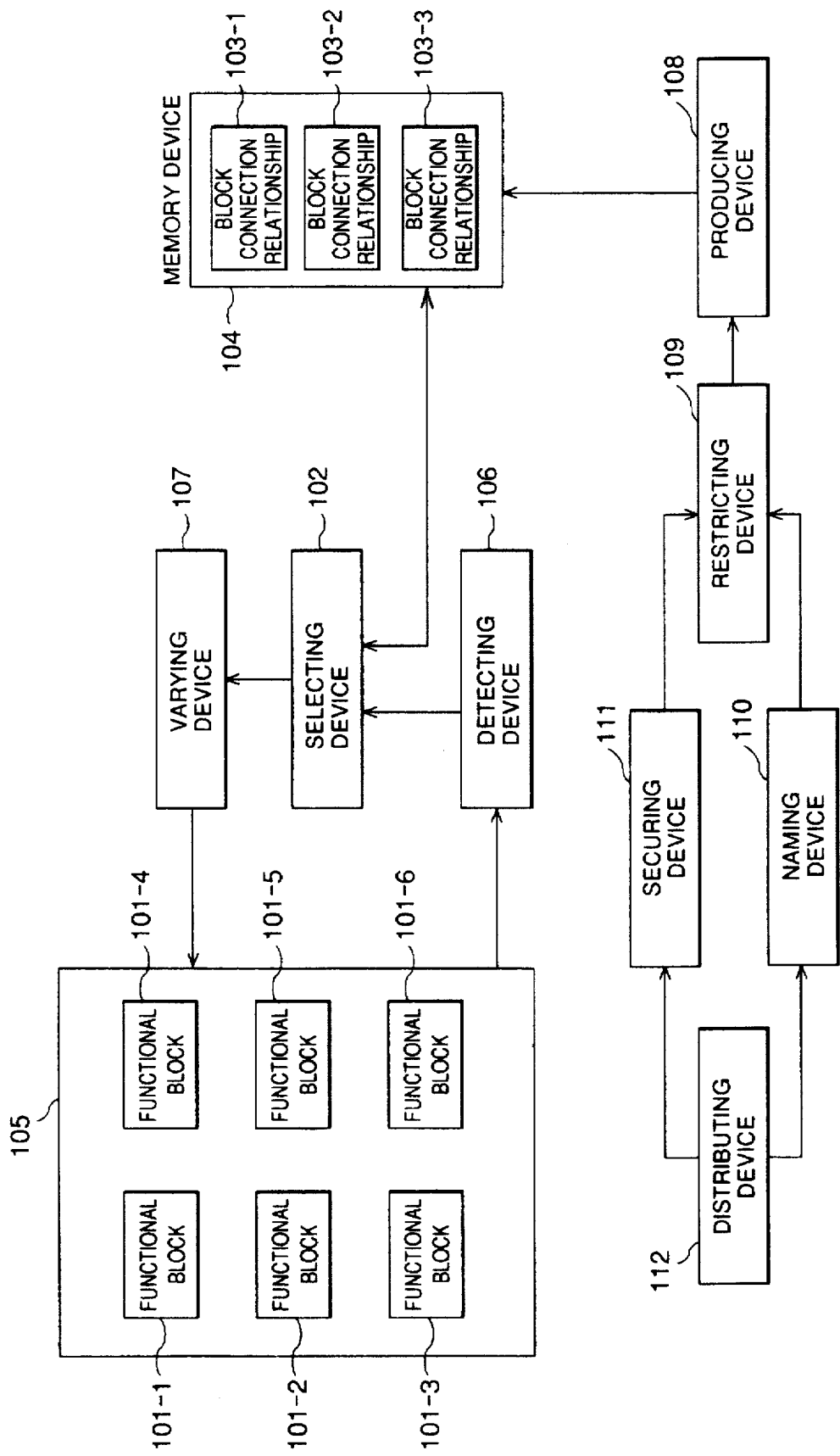
FIG. 1 is a block diagram of a fault-tolerant system according to a first embodiment of this invention.

Referring to FIG. 1, description will be made as regards a fault-tolerant system according to a first embodiment of this invention. The fault-tolerant system comprises a functional block or unit set 105 which has first through n-th functional blocks or units 101-1 to 101-n, where n represents a positive integer which is greater than one. In the example being illustrated, the positive integer is equal to six.

The fault-tolerant system further comprises a selecting device 102, a memory device 104, a detecting device 106, a varying device 107, a producing device 108, a restricting device 109, a naming device 110, a securing device 111, and a distributing device 112, all of which will later be described.

From the restricting device 109, the producing device 108 is supplied with a restricting condition which will later be described. In accordance with the restricting condition, the producing device 108 produces first through third connection relationship data each of which is representative of a connection of functional blocks for a system function. The first through the third connection relationship data are stored as first through third data 103-1 to 103-3 in the memory device 104.

The detecting device 106 detects whether or not each of the first through the sixth functional blocks 101-1 to 101-6 becomes faulty. When any one of the the first through the sixth functional blocks 101-1 to 101-6 becomes faulty, the detecting device 106 supplies the selecting device 102 with a fault signal. The fault signal is representative of a faulty functional block.

Responsive to the fault signal, the selecting device 102 accesses the memory device 104 to select a selected one of the first through the third stored data 103-1 to 103-3 that does not include the faulty functional block. The selected stored data is supplied to the varying device 107. The varying device 107 varies a connection of the functional blocks in accordance with the selected stored data in order to recover the system function.

Now, it will be assumed that it is necessary to use four functional blocks in order to provide the system function.

Figure 2:
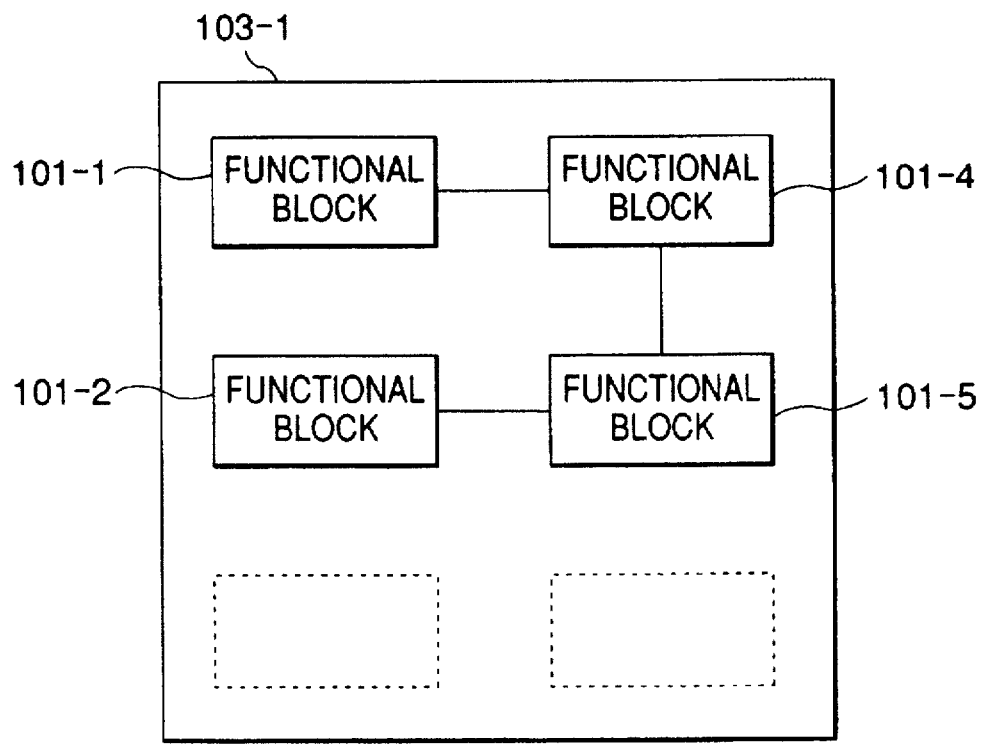
FIG. 2 is a view describing a first connection relationship used in FIG. 1.

FIG. 2 shows a connection relationship of the first stored data 103-1. In FIG. 2, the first, the second, the fourth, and the fifth functional blocks 101-1, 101-2, 101-4, and 101-5 are used in order to construct the system function. The first functional block 101-1 is connected to the fourth functional block 101-4 which is connected to the fifth functional block 101-5. The fifth functional block 101-5 is connected to the second functional block 101-2.

Figure 3:
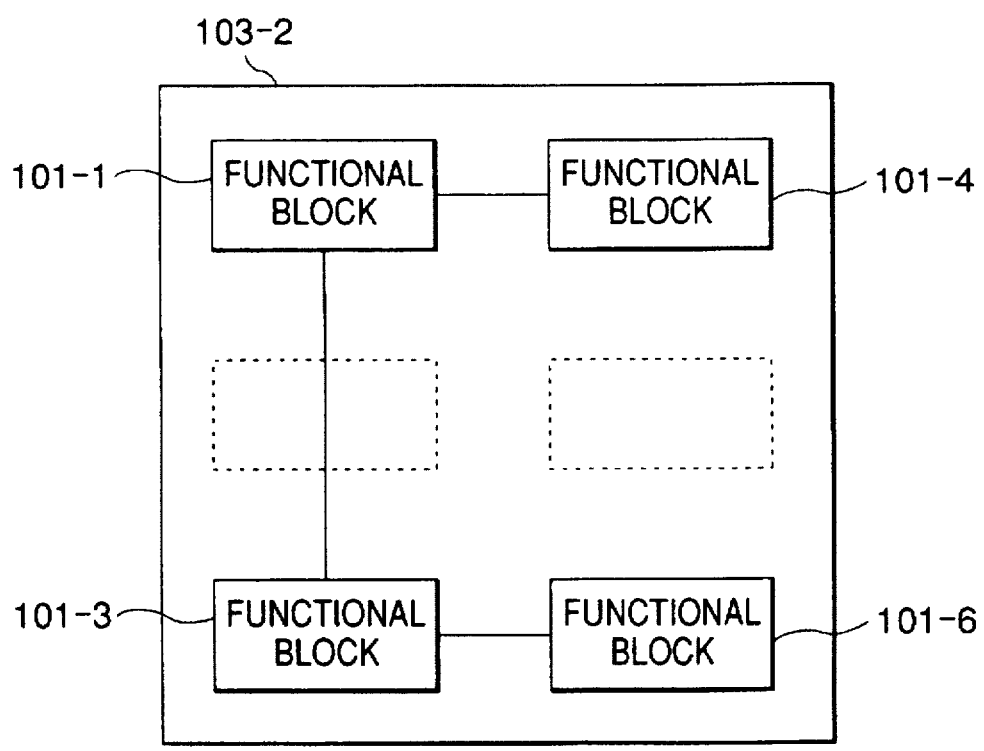
FIG. 3 is a view describing a second connection relationship used in FIG. 1.

FIG. 3 shows a connection relationship of the second stored data 103-2. In FIG. 3, the first, the third, the fourth, and the sixth functional blocks 101-1, 101-3, 101-4, and 101-6 are used in order to construct the system function. The first functional block 101-1 is connected to the third and the fourth functional blocks 101-3 and 101-4. The third functional block 101-3 is connected to the sixth functional block 101-6.

Figure 4:
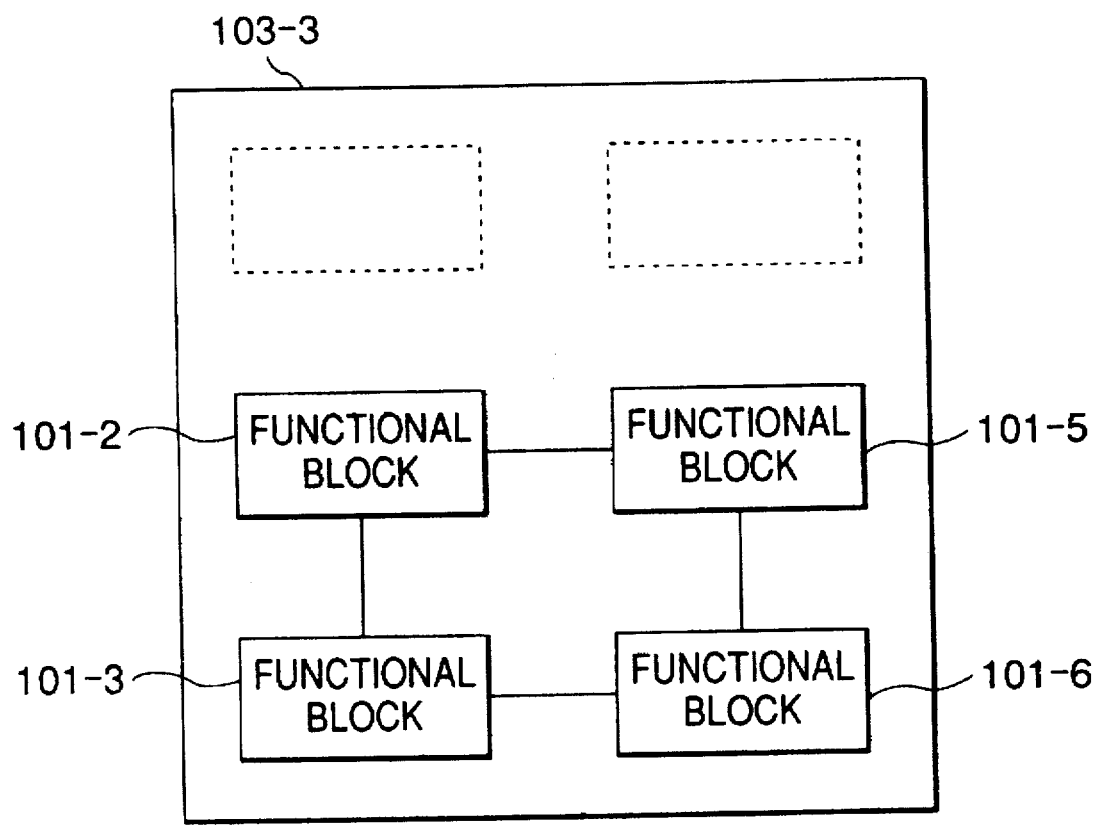
FIG. 4 is a view describing a third connection relationship used in FIG. 1.

FIG. 4 shows a connection relationship of the third stored data 103-3. In FIG. 4, the second, the third, the fifth, and the sixth functional blocks 101-2, 101-3, 101-5, and 101-6 are used in order to construct the system function. The second functional block 101-2 is connected to the third and the fifth functional blocks 101-3 and 101-5. The sixth functional block 101-6 is connected to the third and the fifth functional blocks 101-3 and 101-5.

Referring to FIG. 1 in addition to FIGS. 2 to 4, it will be assumed that the first functional block 101-1 becomes the faulty functional block. In this event, the detecting device 106 produces the fault signal representative of a fault of the first functional block 101-1. Inasmuch as the connection relationship of the third memorized data does not include the first functional blocks 101-1 as shown in FIG. 4, the selecting device 102 accesses the memory device 104 to select the third stored data as the selected memorized data in response to the fault signal. The varying device recovers or reconstructs the system function in accordance with the selected stored data.

As readily understood from the above description, the memory device 104 may stored first through p-th stored data, each of which is representative of a connection relationship for a system function. It is assumed that it is necessary to use m functional blocks of in order to provide the system function, where m represents a positive integer less than the positive integer n and p represents a positive integer greater than one.

It will be assumed that an i-th stored data is representative of an i-th connection relationship, where i represents a positive integer between 1 and p, both inclusive. It will be assumed that $d_i$ is representative of the group of the functional blocks used in i-th connection relationship.

When a function $f_i(x)$ is given by:

$$f_i(x) = \begin{cases} +1 & (x \in d_i) \\ -1 & \text{otherwise} \end{cases} \quad (1)$$

the first through the n-th functional blocks are grouped into groups of $2^p$, each of which is given by:

$$I_k = \{x | \forall i f_i(x) = k_i\}, \quad (2)$$

where k represents a vector of p dimension whose component is 1 or −1. $k_i$ represents an i-th component of the vector.

It will be defined that $P_k$ represents a probability at which a fault does not occur in functional blocks included in a group $I_k$. An effective area $N(k)$ of the group $I_k$ is given by:

$$N(k) = -\frac{1}{\lambda} \ln P_k. \quad (3)$$

It will be defined that the probability of a fault is independent of the functional block in which the fault occurs. Furthermore, it will be assumed that it is possible to provide the system function at a probability R without using the faulty functional block. The probability R is given by:

$$R = Tr\{l\}(-1)^{\|l\|+p+1} \exp(\lambda(Tr\{k \leq l\}(N(k))-1))+1, \quad (4)$$

where Tr(k) is a symbol of $\Sigma_k$ which is representative of the addition of all combinations of the components in the vector of p dimension.

$k \leq l$ is defined by:

$$\forall i\, ki \leq l_i \quad (5)$$

Tr{k≤l} is representative of addition of the components in the vector k that satisfies k≤l. λ is a normalized constant which is determined so as to hold an Equation given by:

$$Tr\{k\}(N(k))=1. \quad (6)$$

|l| is representative of the number of components of +1 in the vector l.

When the probability R becomes large, it is possible to construct the system function at a high probability without using the faulty functional block by employing a selected one of the first through the p-th connection relationships. Therefore, the fault-tolerant system has a high reliability.

Now, it will be assumed that a fault occurs at a same probability in each functional block. In i=1, 2, ..., p, an Equation holds good which is given by:

$$Tr\{k \geq \vec{i}\}(N(k)) = \frac{m}{n}. \quad (7)$$

It will be defined that a vector $\vec{i}$ of p dimension comprises an i-th component of +1 and remaining components each of which has −1. To maximize the probability R given by Equation (4) in N(−1, ..., −1), ..., N(+1, ..., +1) satisfying Equations (6) and (7), an Equation is given by:

$$N(k) = \begin{cases} \frac{1+mp/n-q}{p^c q} & (|k|=q) \\ \frac{q-mp/n}{p^c q-1} & (|k|=q-1) \\ 0 & \text{otherwise} \end{cases} \quad (8)$$

where q is a minimum integer which is not less than mp/n.

N(k) given by Equation (8) is represented as N*(k). Each of the first through the p-th connection relationships satisfying N*(k) will be called an ideal connection relationship.

The number of functional blocks included in $I_k$ in the ideal connection relationship becomes N*(k)×n. When N*(k)×n is not an integer, it is impossible to realize the ideal connection relationship.

Therefore, production is carried out in the following fashion in regard to the first through the p-th connection relationships, each of which is approximately equal to the ideal connection relationship.

[x] is representative of an integer component of x. When n*(k) is equal to [N*(k)×n], n*(k) is representative of an integer component of the number of the functional blocks included in $I_k$ when the ideal connection relationship is carried out. Therefore, the n*(k) becomes an integer.

The distributing device 112 separates the functional blocks of n into selected functional blocks of n" and remaining functional blocks of n', where n" represents Tr{k}n*(k) which is representative of securing functional blocks of N*(k) in each group $I_k$. n' represents n−n". The distributing device 112 distributes the functional blocks of n" and the functional blocks of n' to the securing device 111 and the naming device 110, respectively.

The securing device 111 distributes the functional blocks of n" to the groups I*k of $2^p$ so as to become |I*k|=n*(k). Namely, the securing device 111 secures an integer component of N*(k)×n representative of the number of the functional blocks included in each group $I_k$ of $2^p$ in the ideal connection relationship.

The naming device 110 names the functional blocks of n' as a remainder (0), ..., a remainder (n'−1), respectively.

Now, m' is given by:

$$m' = m - Tr\{k \geq i\}n^*(k). \quad (9)$$

In Equation (9), the right side has the same value as the positive integer i.

The restricting device 109 is supplied with the output of the naming device 110 and the output of the securing device 111. The restricting device 109 produces first through p-th restrictions in the following fashion so as to approximate the use of the functional blocks in the ideal connection relationship.

It will be defined that the first restriction d*$_1$ is defined by $k \geq \vec{1}$. Furthermore, it will be defined that the functional blocks defined by the first restriction d*$_1$ are included in the group $I_k$ ($k \geq \vec{1}$) or are included in {remainder (([n'1/p]+1) mod n'), remainder (([n'1/p]+2)mod n', ..., remainder (([n'1/p]+m')mod n')}.

Similarly, it will be defined that the i-th restriction d*$_i$ is defined by $k \geq \vec{i}$. Furthermore, it will be assumed that the functional blocks defined by the i-th restriction d*$_i$ are included in the group $I_k$ ($k \geq \vec{i}$) or are included in {remainder (([n'i/p]+1)mod n'), remainder (([n'i/p]+2)mod n', ..., remainder (([n'i/p]+m')mod n')}, where i is variable between 1 and p, both inclusive. The i-th restriction d*$_i$ is representative of usable functional blocks in the i-th connection relationship.

By using the functional blocks included in the first restriction d*$_1$, the producing device 108 produces a first connection relationship for providing the first system function. By using the functional blocks included in the second restriction d*$_2$, the producing device 108 produces a second connection relationship for providing the second system function. Accordingly, the producing device 108 produces a connection relationship for providing the p-th system function by using the functional blocks included in the p-th restriction d*$_p$. On specifying the functional blocks to be used, the method described in the above-mentioned article contributed by J. Narasimhan et al may be used in order to produce a connection relationship which only uses the specified functional blocks.

The first through the p-th connection relationships, which are produced in the producing device 108 in the above fashion, are memorized in the memory device 104. As a result, the fault-tolerant system has a high reliability since N(k) is obtained which is nearly equal to N*(k).

As is readily understood from the above description, it is possible for the fault-tolerant system of this invention to rapidly recover the system function after detecting the faulty functional block.

Figure 5:
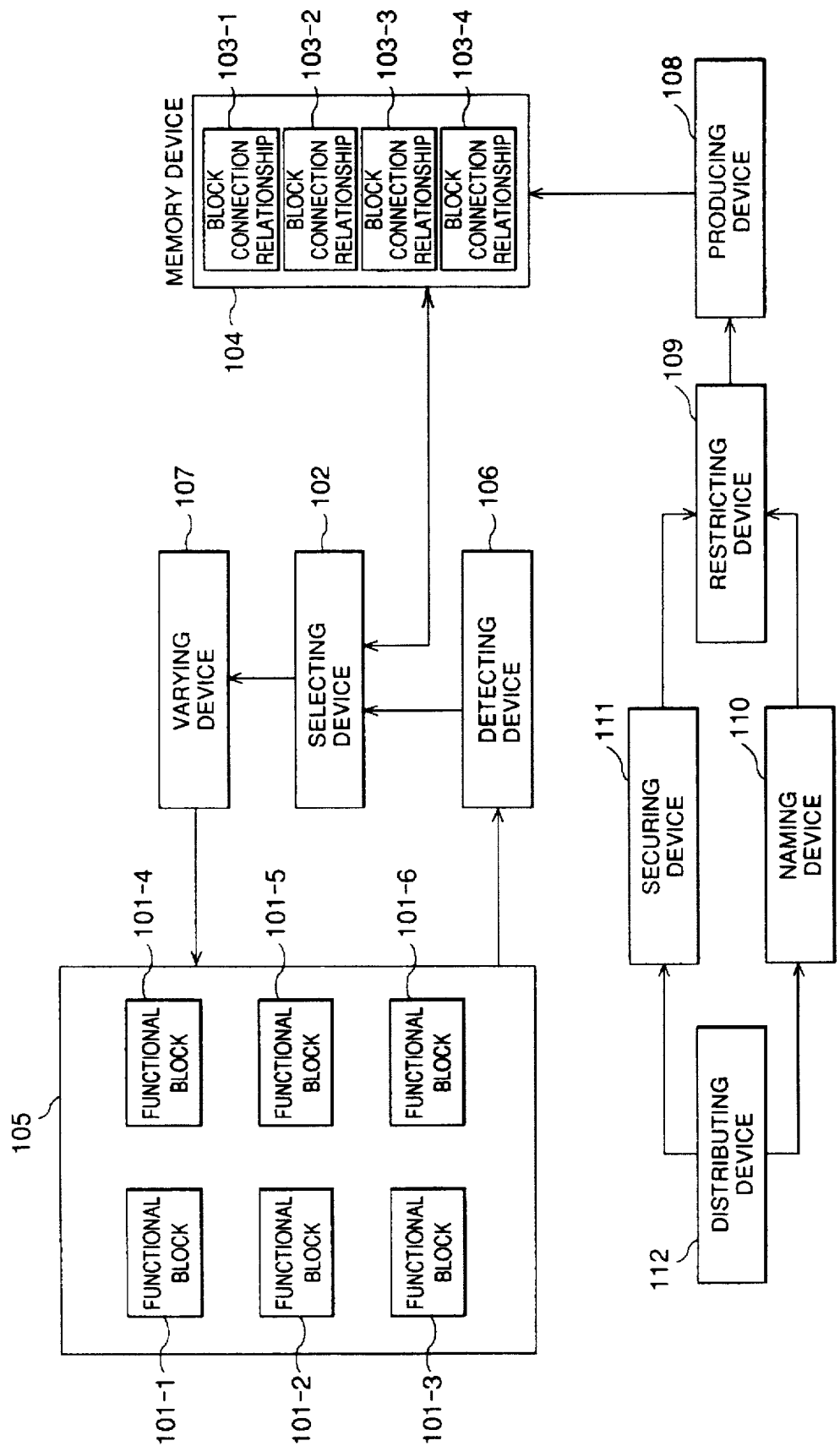
FIG. 5 is a block diagram of a fault-tolerant system according to a second embodiment of this invention.
Figure 6:
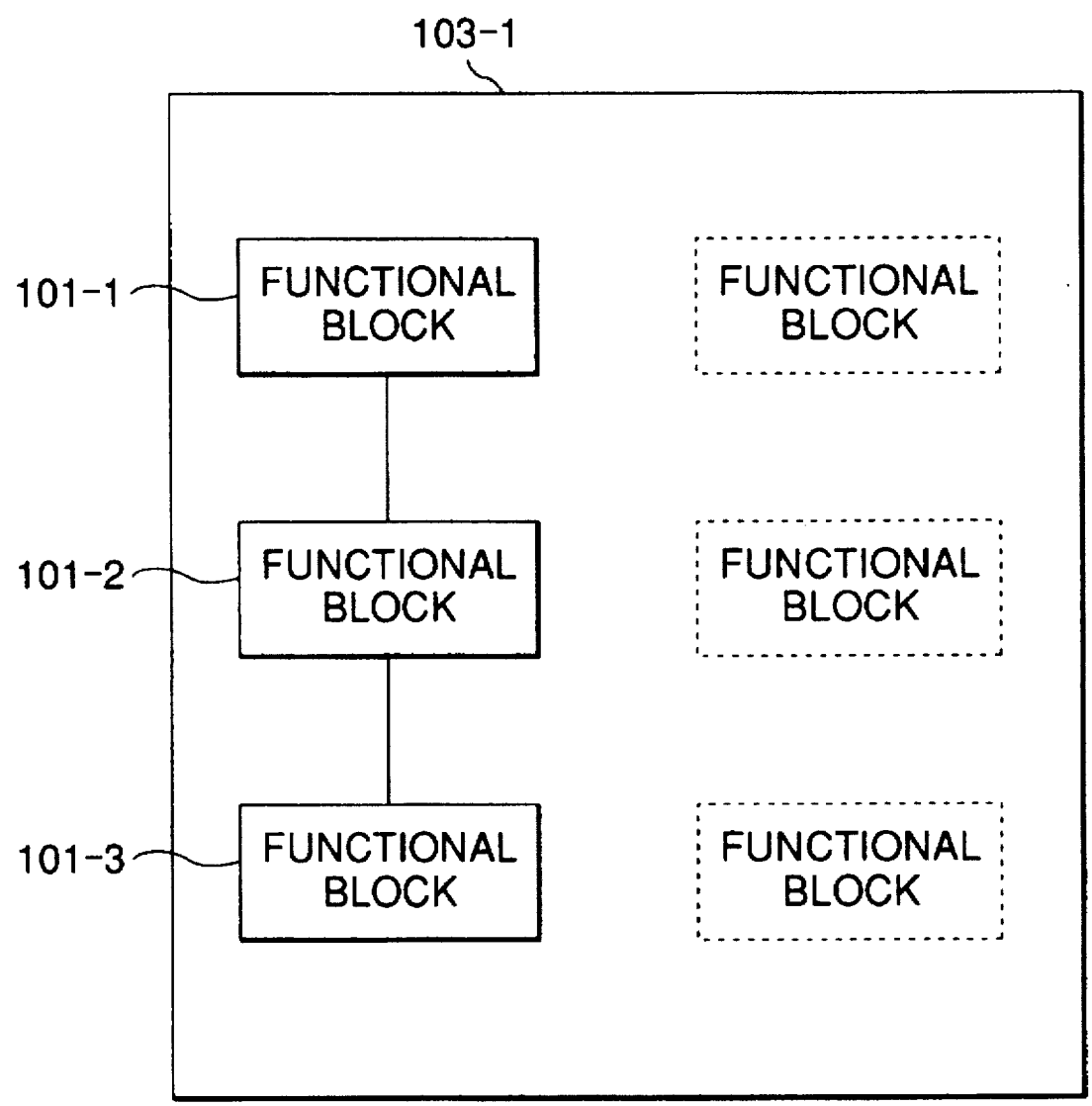
FIG. 6 is a view describing a first connection relationship used in FIG. 5.
Figure 7:
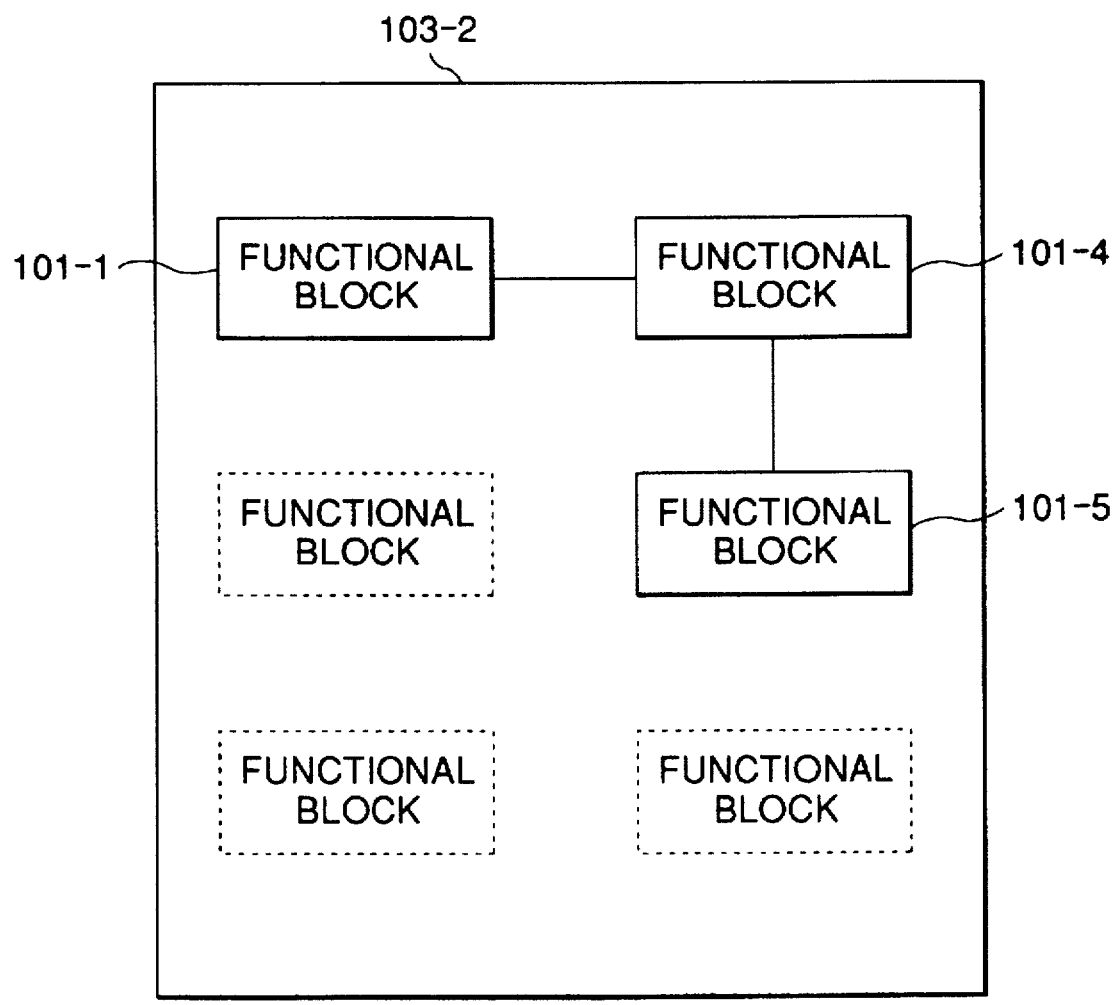
FIG. 7 is a view describing a second connection relationship used in FIG. 5.
Figure 8:
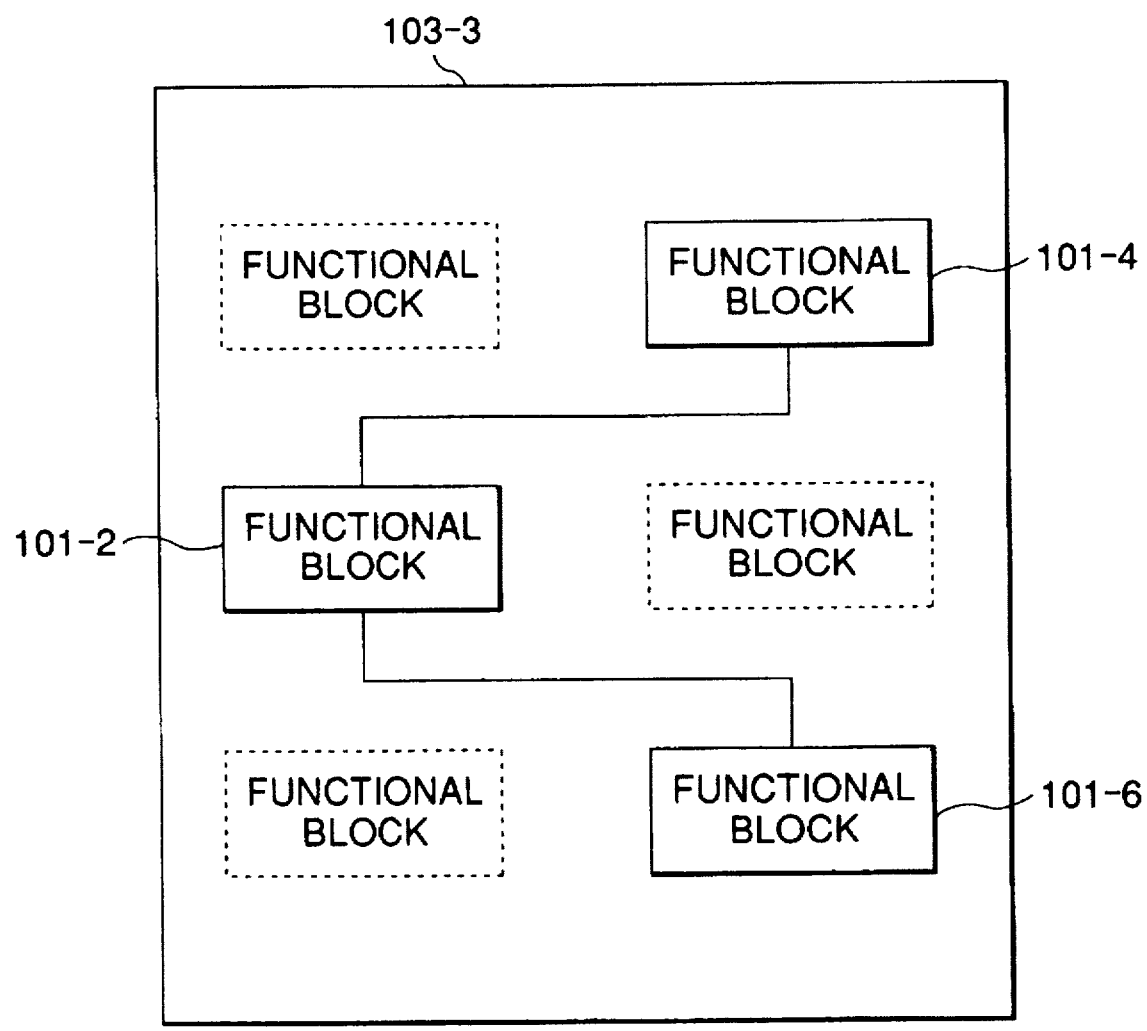
FIG. 8 is a view describing a third connection relationship used in FIG. 5.
Figure 9:
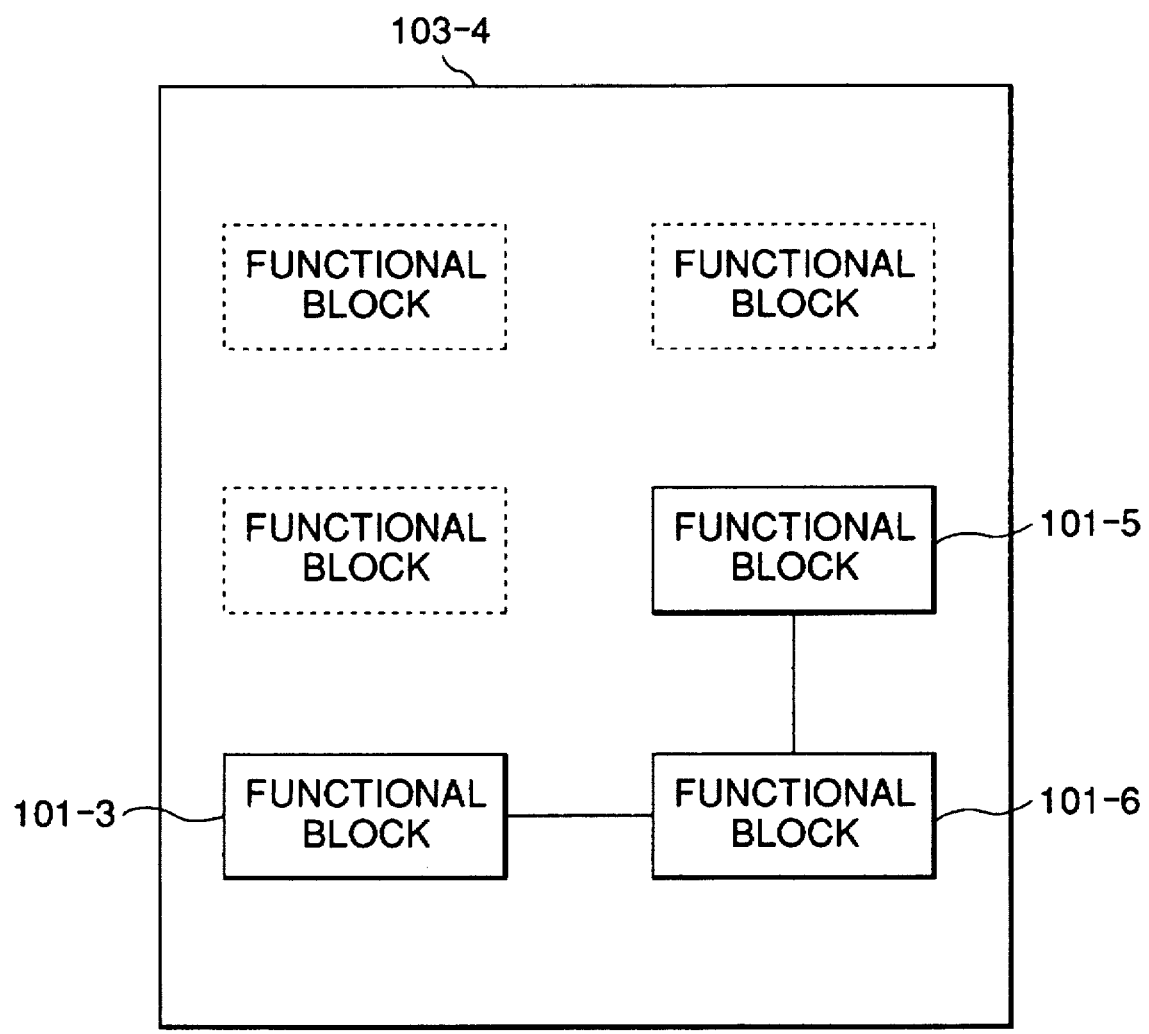
FIG. 9 is a view describing a fourth connection relationship used in FIG. 5.

Referring to FIG. 5, description will proceed to a fault-tolerant system according to a second embodiment of this invention. The illustrated fault-tolerant system is similar in structure to the fault-tolerant system illustrated in FIG. 1. In FIG. 5, the system function is constructed by three functional blocks. The memory device 104 memorizes first through fourth memorized data which are representative of first through fourth connection relationships, respectively.

In FIG. 5, N*(k) is given by:

$$1/6 = N*(+1,+1,-1,-1) \qquad (10)$$
$$= N*(+1,-1,+1,-1)$$
$$= N*(+1,-1,-1,+1)$$
$$= N*(-1,+1,+1,-1)$$
$$= N*(-1,+1,-1,+1)$$
$$= N*(-1,-1,+1,+1),$$

where remaining N*(k) becomes N*(k)=0.

n*(k) is given by:

$$1 = n*(+1,+1,-1,-1) \qquad (11)$$
$$= n*(+1,-1,+1,-1)$$
$$= n*(+1,-1,-1,+1)$$
$$= n*(-1,+1,+1,-1)$$
$$= n*(-1,+1,-1,+1)$$
$$= n*(-1,-1,+1,+1),$$

where remaining n*(k) becomes n*(k)=0.

Furthermore, n''=6, n'=0, and m'=0.

It will be assumed that each group $I*_k$ is given by:

$I*_{(+1,+1,-1,-1)}$={functional block 101-1}
$I*_{(+1,-1,+1,-1)}$={functional block 101-2}
$I*_{(+1,-1,-1,+1)}$={functional block 101-3}
$I*_{(-1,+1,+1,-1)}$={functional block 101-4}
$I*_{(-1,+1,-1,+1)}$={functional block 101-5}
$I*_{(-1,-1,+1,+1)}$={functional block 101-5}

Each $d*_i$ is given by:

$d*_1$={functional blocks 101-1, 101-2, and 101-3}
$d*_2$={functional blocks 101-1, 101-4, and 101-5}
$d*_3$={functional blocks 101-2, 101-4, and 101-6}
$d*_4$={functional blocks 101-3, 101-5, and 101-6}

Therefore, the first through the fourth connection relationships are shown in FIGS. 6 to 9, respectively. The first through the fourth connection relationships are memorized in memory device 104. One of the first through the fourth connection relationships is selected by the selecting device 102 in a similar manner described above.

Figure 10:
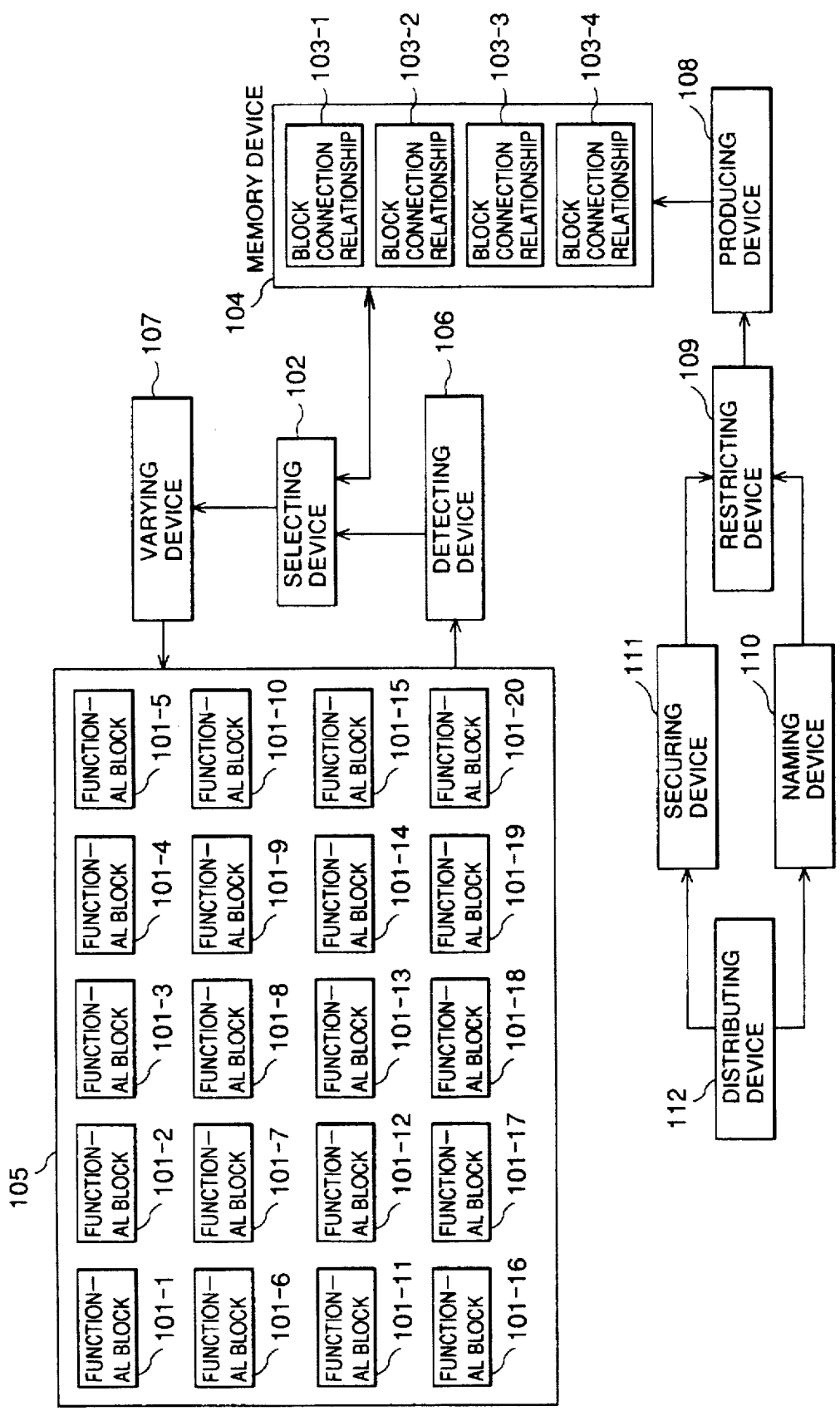
FIG. 10 is a block diagram of a fault-tolerant system according to a third embodiment of this invention.
Figure 11:
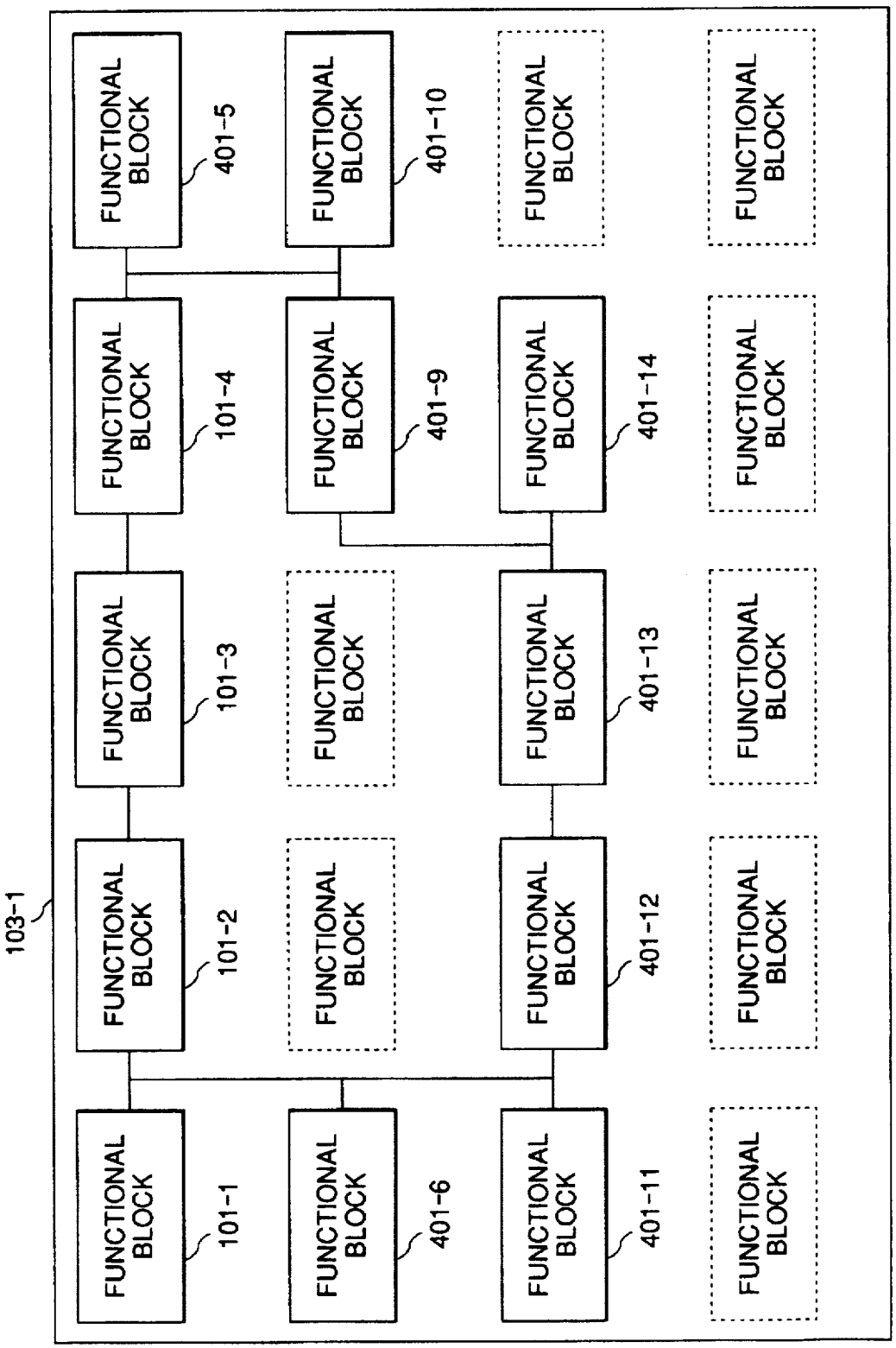
FIG. 11 is a view describing a first connection relationship used in FIG. 10.
Figure 12:
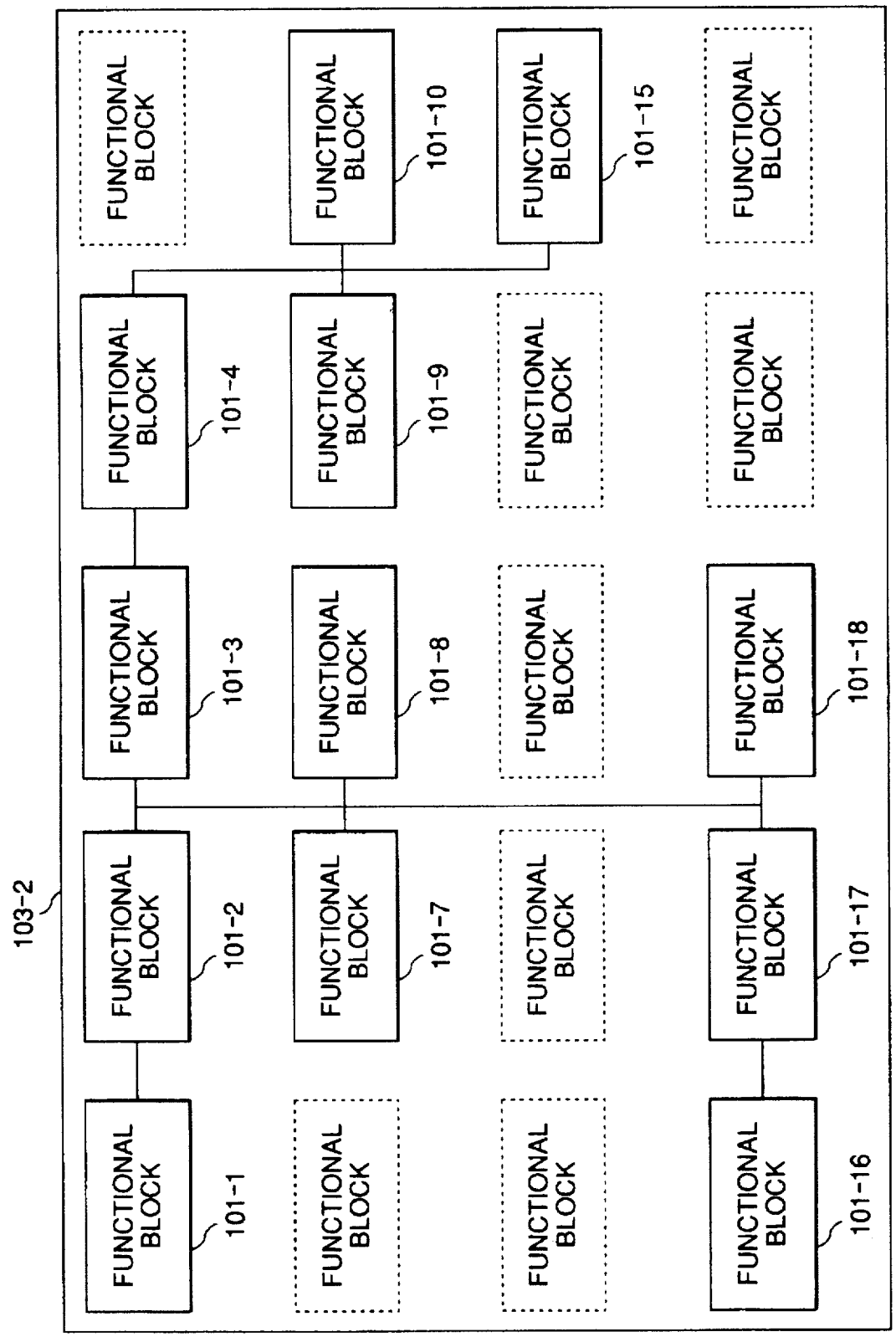
FIG. 12 is a view describing a second connection relationship used in FIG. 10.
Figure 13:
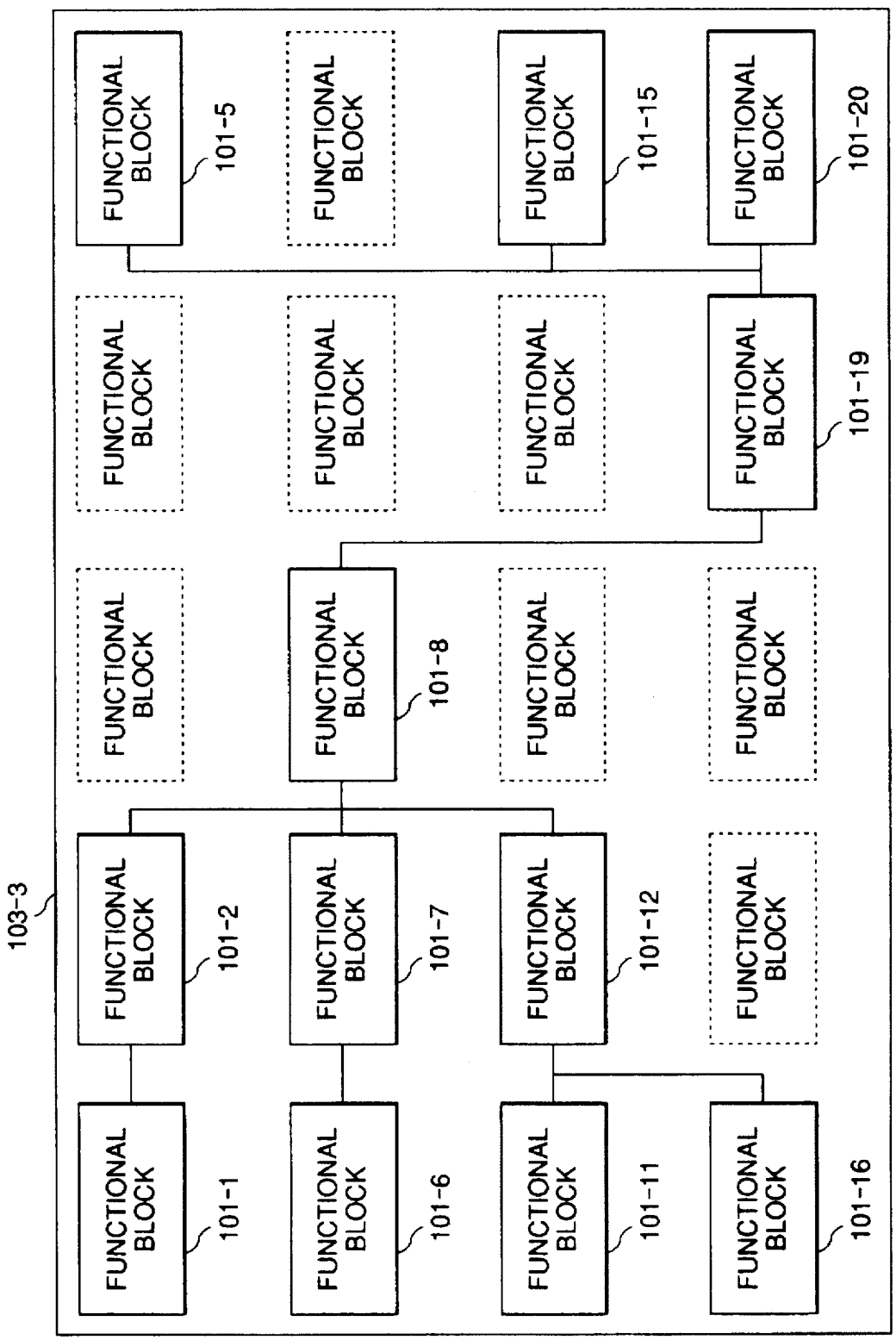
FIG. 13 is a view describing a third connection relationship used in FIG. 10.
Figure 14:
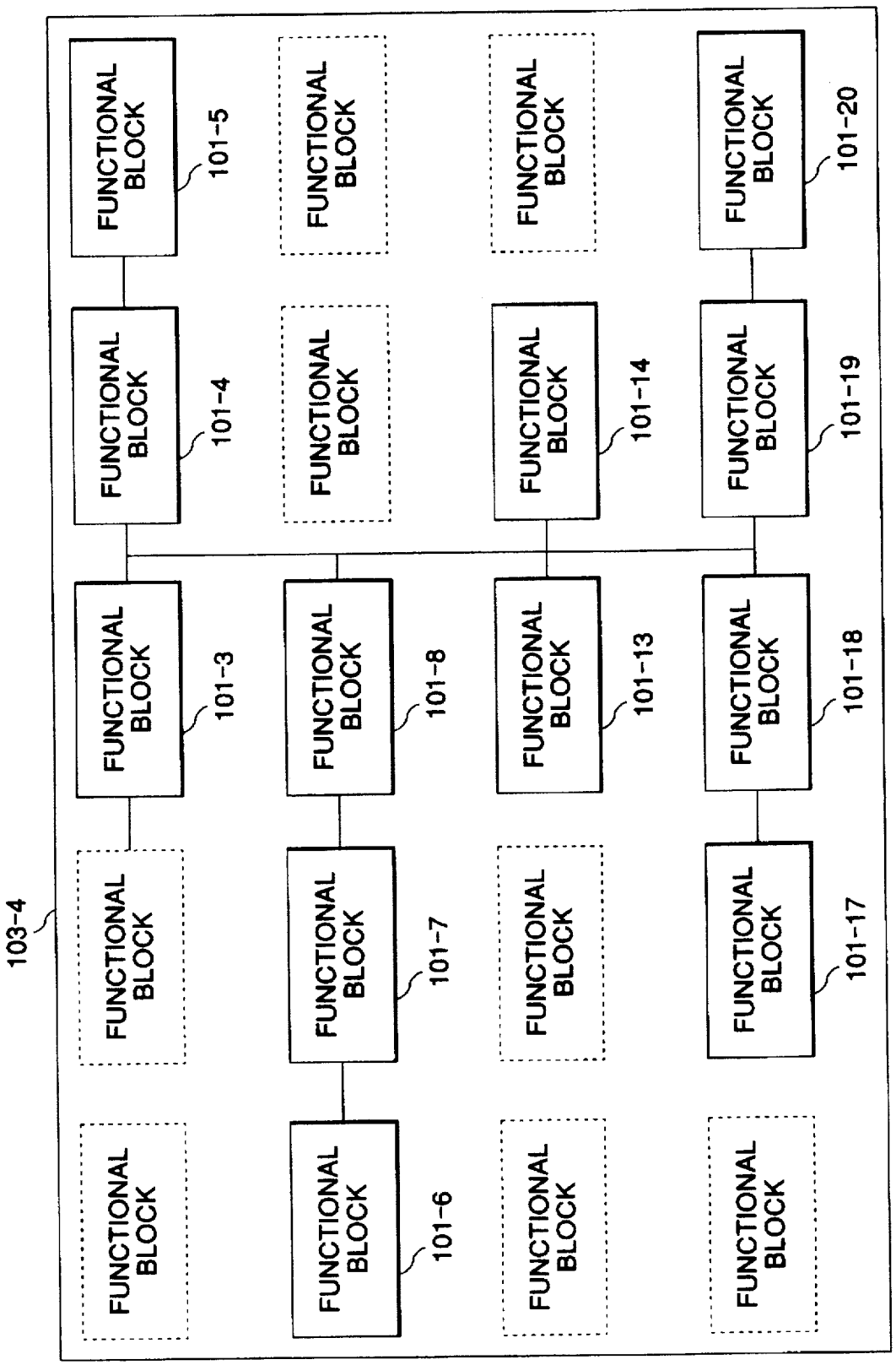
FIG. 14 is a view describing a fourth connection relationship used in FIG. 10.

Referring to FIG. 10, description will proceed to a fault-tolerant system according to a third embodiment of this invention. The illustrated fault-tolerant system is similar in structure to the fault-tolerant system illustrated in FIG. 1. In FIG. 10, the functional block group 105 has first through twentieth functional blocks 101-1 to 101-20. The system function is provided by twelve functional blocks. The memory device 104 stores first through the fourth stored data which are representative of first through fourth connection relationships, respectively.

In FIG. 10, N*(k) is given by:

$$1/10 = N*(+1,+1,+1,-1) \qquad (12)$$
$$= N*(+1,+1,-1,+1)$$
$$= N*(+1,-1,+1,+1)$$
$$= N*(-1,+1,+1,+1)$$
$$= N*(+1,+1,-1,-1)$$
$$= N*(+1,-1,+1,-1)$$
$$= N*(+1,-1,-1,+1)$$
$$= N*(-1,+1,+1,-1)$$
$$= N*(-1,+1,-1,+1)$$
$$= N*(-1,-1,+1,+1),$$

where remaining N*(k) becomes N*(k)=0.

n*(k) is given by:

$$2 = n*(+1,+1,+1,-1) \qquad (13)$$
$$= n*(+1,+1,-1,+1)$$
$$= n*(+1,-1,+1,+1)$$
$$= n*(-1,+1,+1,+1)$$
$$= n*(+1,+1,-1,-1)$$
$$= n*(+1,-1,+1,-1)$$
$$= n*(+1,-1,-1,+1)$$
$$= n*(-1,+1,+1,-1)$$
$$= n*(-1,+1,-1,+1)$$
$$= n*(-1,-1,+1,+1),$$

where remaining n*(k) becomes n*(k)=0.

Furthermore, n''=20, n'=0, and m'=0.

It will be assumed that each group $I*_k$ is given by $I*_{(+1,+1,+1,-1)}$={functional blocks 101-1 and 101-2}
$I*_{(+1,+1,-1,+1)}$={functional blocks 101-3 and 101-4}
$I*_{(+1,-1,+1,+1)}$={functional blocks 101-5 and 101-6}
$I*_{(-1,+1,+1,+1)}$={functional blocks 101-7 and 101-8}
$I*_{(+1,+1,-1,-1)}$={functional blocks 101-9 and 101-10}
$I*_{(+1,-1,+1,-1)}$={functional blocks 101-11 and 101-12}
$I*_{(+1,-1,-1,+1)}$={functional blocks 101-13 and 101-14}
$I*_{(-1,+1,+1,-1)}$={functional blocks 101-15 and 101-16}
$I*_{(-1,+1,-1,+1)}$={functional blocks 101-17 and 101-18}
$I*_{(-1,-1,+1,+1)}$={functional blocks 101-19 and 101-20}

Each $d*_i$ is given by:

$d*_1$ = {functional blocks 101-1, 101-2, 101-3, 101-4, 101-5, 101-6, 101-9, 101-10, 101-11, 101-12, 101-13, and 101-14}

$d*_2$ = {functional blocks 101-1, 101-2, 101-3, 101-4, 101-7, 101-8, 101-9, 101-10, 101-15, 101-16, 101-17, and 101-18}

$d*_3$ = {functional blocks 101-1, 101-2, 101-5, 101-6, 101-7, 101-8, 101-11, 101-12, 101-15, 101-16, 101-19, and 101-20}

$d*_4$ = {functional blocks 101-3, 101-4, 101-5, 101-6, 101-7, 101-8, 101-13, 101-14, 101-17, 101-18, 101-19, and 101-20}

Therefore, the first through the fourth connection relationships are shown in FIGS. 11 to 14, respectively. The first through the fourth connection relationships are stored memorized in the memory device 104. One of the first through the fourth connection relationships is selected by the selecting device 102 in a similar manner described above.

Figure 15:
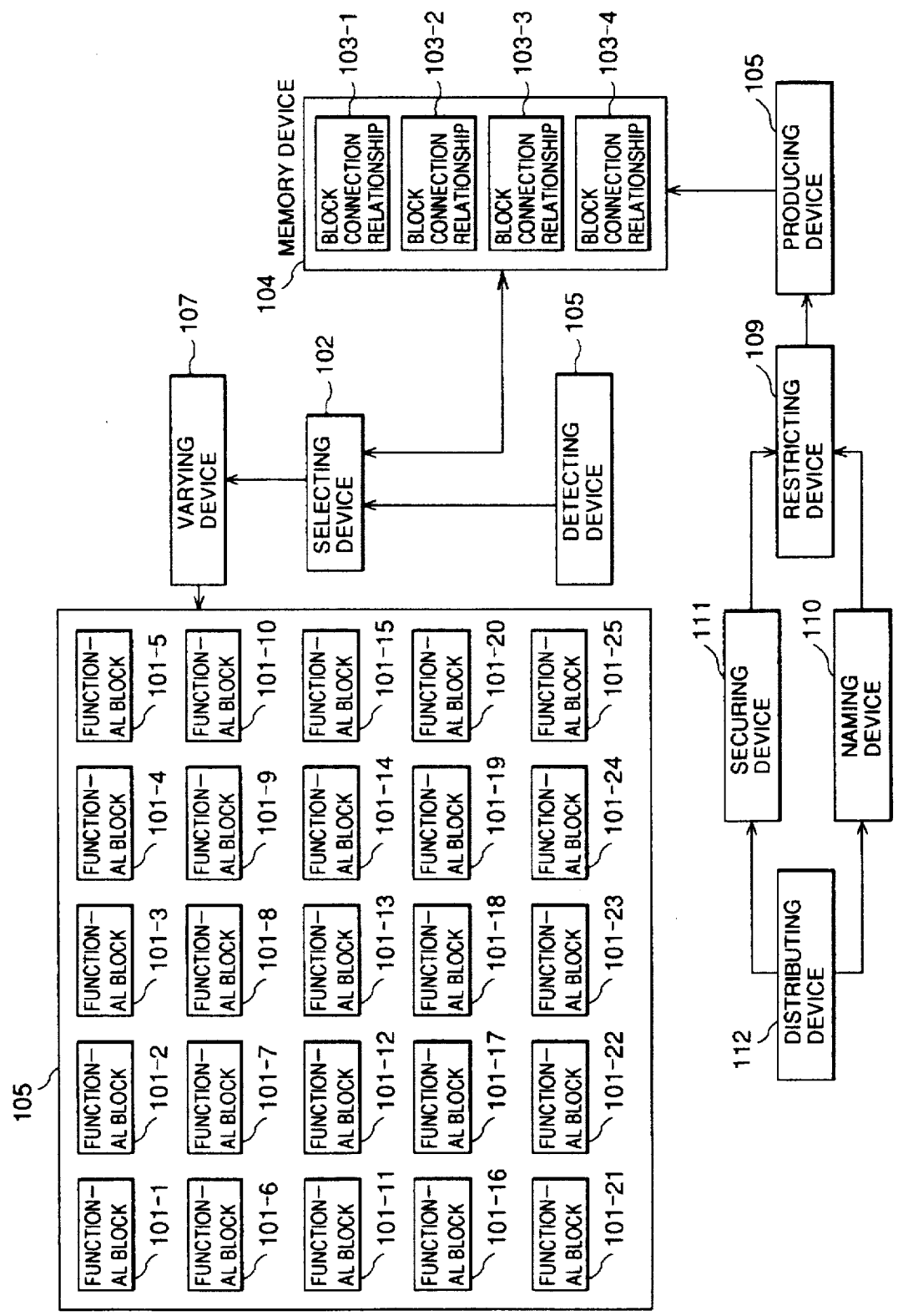
FIG. 15 is a block diagram of a fault-tolerant system according to a fourth embodiment of this invention.
Figure 16:
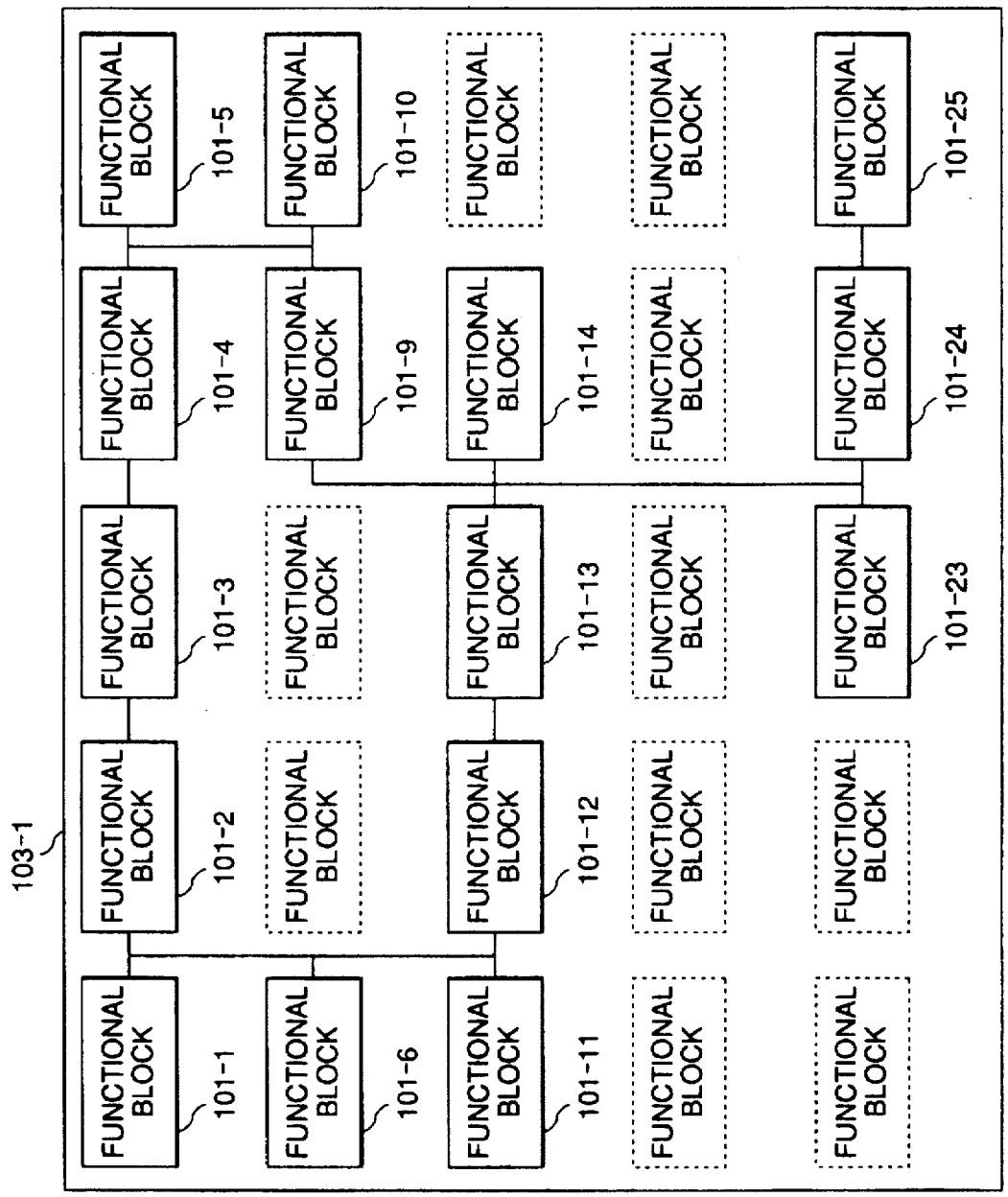
FIG. 16 is a view describing a first connection relationship used in FIG. 15.
Figure 17:
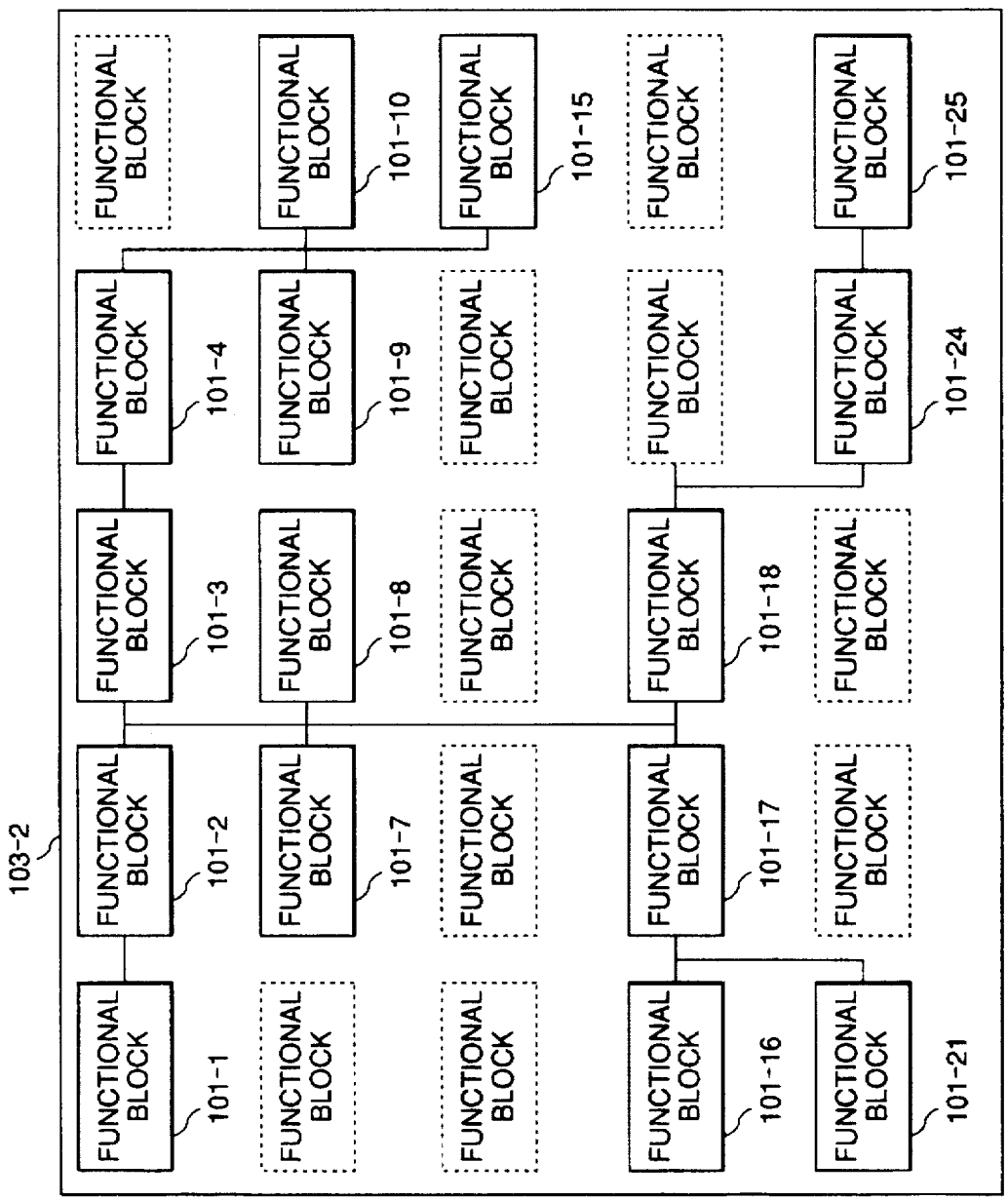
FIG. 17 is a view describing a second connection relationship used in FIG. 15.
Figure 18:
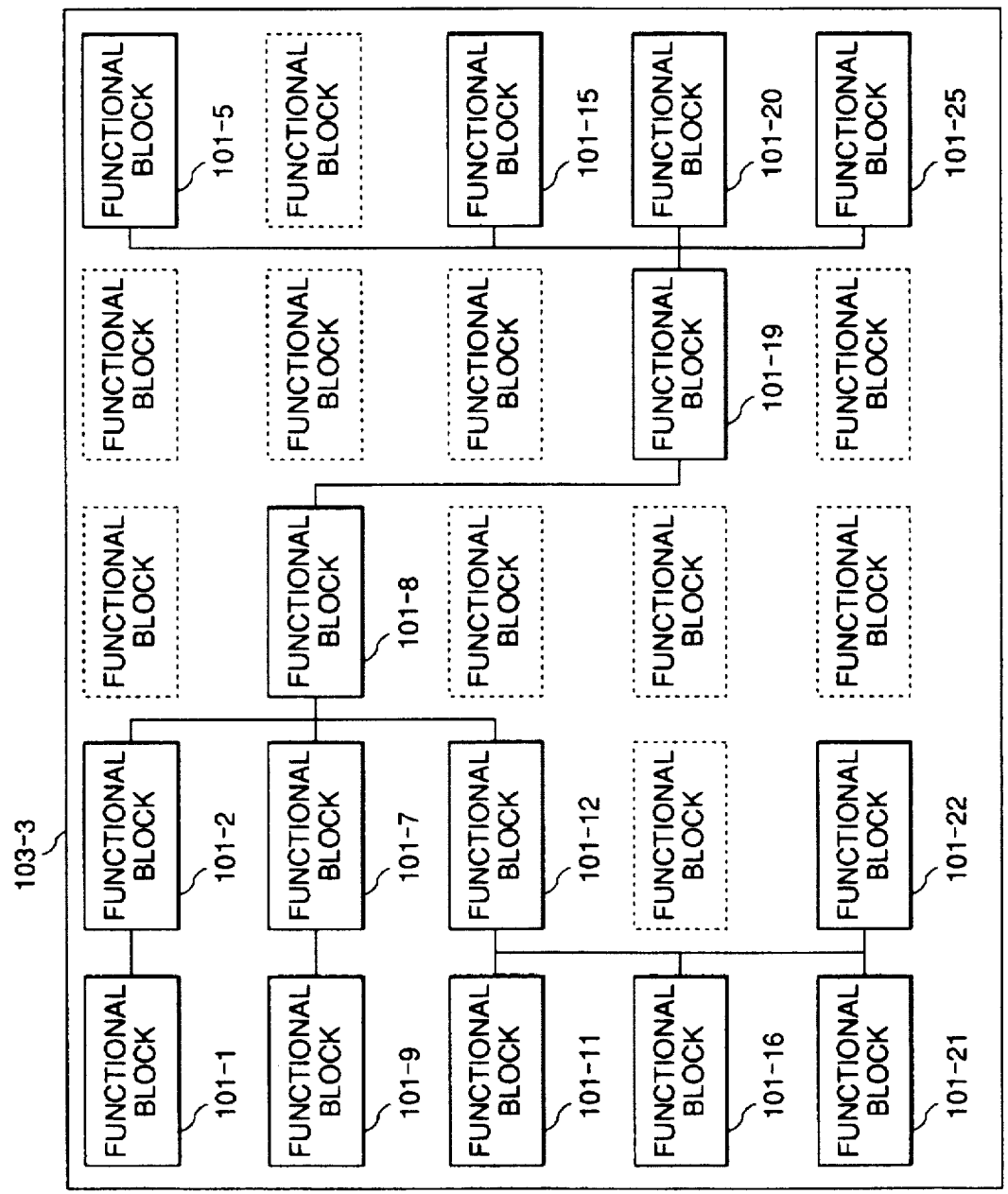
FIG. 18 is a view describing a third connection relationship used in FIG. 15.
Figure 19:
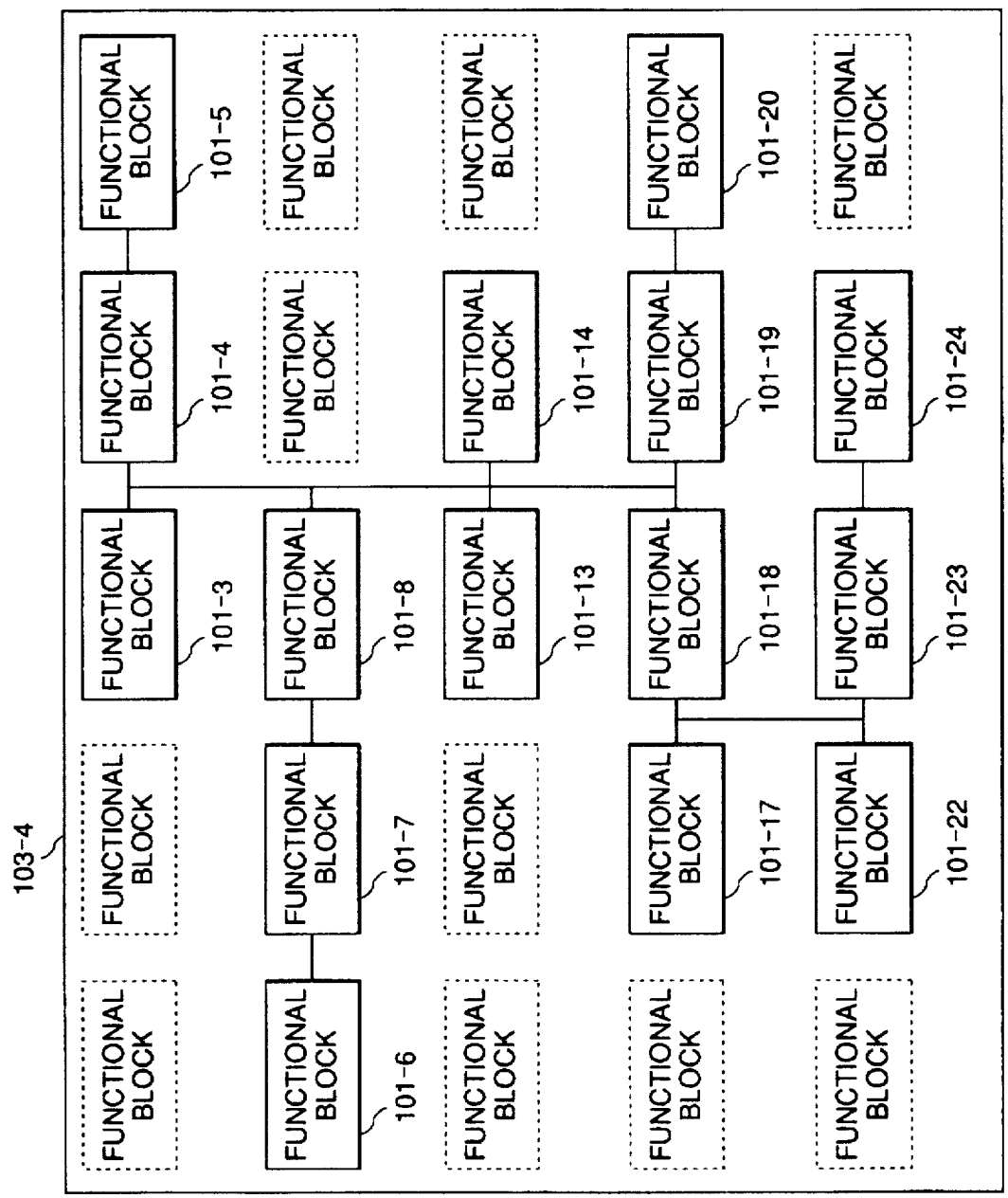
FIG. 19 is a view describing a fourth connection relationship used in FIG. 15.

Referring to FIG. 15, description will proceed to a fault-tolerant system according to a fourth embodiment of this invention. The illustrated fault-tolerant system is similar in structure to the fault-tolerant system illustrated in FIG. 1. In FIG. 15, the functional block group 105 has first through 25th functional blocks 101-1 to 101-25. The system function is provided by fifteen functional blocks. The memory device 104 stores first through the fourth stored data which are representative of first through fourth connection relationships, respectively.

In FIG. 15, N*(k) is given by:

$$1/10 = N^*(+1,+1,+1,-1) \quad (14)$$
$$N^*(+1,+1,-1,+1)$$
$$N^*(+1,-1,+1,+1)$$
$$N^*(-1,+1,+1,+1)$$
$$N^*(+1,+1,-1,-1)$$
$$N^*(+1,-1,+1,-1)$$
$$N^*(+1,-1,-1,+1)$$
$$N^*(-1,+1,+1,-1)$$
$$N^*(-1,+1,-1,+1)$$
$$N^*(-1,-1,+1,+1),$$

where remaining N*(k) becomes N*(k)=0.

n*(k) is given by:

$$2 = n^*(+1,+1,+1,-1) \quad (15)$$
$$n^*(+1,+1,-1,+1)$$
$$n^*(+1,-1,+1,+1)$$
$$n^*(-1,+1,+1,+1)$$
$$n^*(+1,+1,-1,-1)$$
$$n^*(+1,-1,+1,-1)$$
$$n^*(+1,-1,-1,+1)$$
$$n^*(-1,+1,+1,-1)$$
$$n^*(-1,+1,-1,+1)$$
$$n^*(-1,-1,+1,+1),$$

where remaining n*(k) becomes n*(k)=0.

Furthermore, n"=20, n'=5, and m'=3.

It will be assumed that the distributing device 112 distributes the first through the twentieth functional blocks to the securing device 111 and distributes the 21st through the 25th functional blocks to the naming device 110. Furthermore, it will be assumed that each group I*k is given by:

$I^*_{(+1,+1,+1,-1)}$={functional blocks 101-1 and 101-2}

$I^*_{(+1,+1,-1,+1)}$={functional blocks 101-3 and 101-4}

$I^*_{(+1,-1,+1,+1)}$={functional blocks 101-5 and 101-6}

$I^*_{(-1,+1,+1,+1)}$={functional blocks 101-7 and 101-8}

$I^*_{(+1,+1,-1,-1)}$={functional blocks 101-9 and 101-10}

$I^*_{(+1,-1,+1,-1)}$={functional blocks 101-11 and 101-12}

$I^*_{(+1,-1,-1,+1)}$={functional blocks 101-13 and 101-14}

$I^*_{(-1,+1,+1,-1)}$={functional blocks 101-15 and 101-16}

$I^*_{(-1,+1,-1,+1)}$={functional blocks 101-17 and 101-18}

$I^*_{(-1,-1,+1,+1)}$={functional blocks 101-19 and 101-20}

As a result, the 21st functional block 101-21 is named as a remainder(0). The 22nd functional block 101-22 is named as a remainder(1). The 23rd functional block 101-23 is named as a remainder(2). The 24th functional block 101-24 is named as a remainder(3). The th functional block 101-25 is named as a remainder(4).

Each d*i is given by:

$d^*_1$ = {functional blocks 101-1, 101-2, 101-3, 101-4, 101-5, 101-6, 101-9, 101-10, 101-11, 101-12, 101-13, 101-14, 101-23, 101-24, and 101-25}

$d^*_2$ = {functional blocks 101-1, 101-2, 101-3, 101-4, 101-7, 101-8, 101-9, 101-10, 101-15, 101-16, 101-17, 101-18, 101-21, 101-24, and 101-25}

$d^*_3$ = {functional blocks 101-1, 101-2, 101-5, 101-6, 101-7, 101-8, 101-11, 101-12, 101-15, 101-16, 101-19, 101-20, 101-21, 101-22, and 101-25}

$d^*_4$ = {functional blocks 101-3, 101-4, 101-5, 101-6, 101-7, 101-8, 101-13, 101-14, 101-17, 101-18, 101-19, 101-20, 101-22, 101-23, and 101-24}

Therefore, the first through the fourth connection relationships are shown in FIGS. 16 to 19, respectively. The first through the fourth connection relationships are memorized in memory device 104. One of the first through the fourth connection relationships is selected by the selecting device 102 in a similar manner described above.

What is claimed is:

1. A fault-tolerant system having a predetermined system function and comprising a plurality of functional blocks for providing said predetermined system function and for recovering said predetermined system function when one of said selected functional blocks is determined to be faulty, said fault-tolerant system comprising:

a memory for storing a plurality of block connection relationships, each of which is representative of functional block connections for providing said predetermined system function;

first means for producing a plurality of ideal block connection relationships in accordance with first, second and third numbers, said first number being representative of the number of said functional blocks, said second number being representative of the number of functional blocks for providing said predetermined system function, said third number being representative of the number of said block connection relationships, said first means being further for separating said functional blocks into either one of first and second block sets in accordance with said ideal block connection relationships;

second means for allocating the functional blocks included in said first block set into a plurality of groups on the basis of said ideal block connection relationships to produce a plurality of block groups;

third means for naming the functional blocks included in said second block set to produce named functional blocks;

fourth means for producing a plurality of restricting conditions in accordance with said block groups and said named functional blocks, said restricting conditions being representative of restrictions on forming said ideal block connection relationships;

fifth means for producing said block connection relationships on the basis of said restricting conditions;

detecting means for detecting a faulty functional block and producing a fault signal;

accessing means responsive to said fault signal for accessing said memory to select one of said block connection relationships that does not include said faulty functional block; and recovery means for recovering said predetermined system function in accordance with a selected block connection relationship.

2. A method for recovering a predetermined system function which is provided by less than all of functional blocks of said system, comprising:

defining a plurality of ideal block connection relationships in accordance with first, second and third numbers, said first number being representative of the number of said functional blocks, said second number being representative of the number of functional blocks for providing said predetermined system function, said third number being representative of the number of said block connection relationships;

assigning said functional blocks to one of a first or a second block set in accordance with said ideal block connection relationships;

allocating the functional blocks included in said first block set to a plurality of groups on the basis of said ideal block connection relationships to produce a plurality of block groups;

naming the functional blocks included in said second block set to produce named functional blocks;

defining a plurality of restricting conditions in accordance with said block groups and said named functional blocks, said restricting conditions being representative of restrictions on forming said ideal block connection relationships;

defining block connection relationships on the basis of said restricting conditions;

detecting a faulty functional block;

selecting one of said block connection relationships that does not include said faulty functional block; and recovering said predetermined system function in accordance with said selected block connection relationship.

* * * * *